US 7,787,385 B2

(12) United States Patent
Wybenga et al.

(10) Patent No.: US 7,787,385 B2
(45) Date of Patent: Aug. 31, 2010

(54) APPARATUS AND METHOD FOR ARCHITECTURALLY REDUNDANT ETHERNET

(75) Inventors: Jack C. Wybenga, Plano, TX (US);
Patricia Kay Sturm, Marion, IA (US);
Steven Eugene Tharp, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 11/043,021

(22) Filed: Jan. 25, 2005
(Under 37 CFR 1.47)

(65) Prior Publication Data
US 2006/0165077 A1 Jul. 27, 2006

(51) Int. Cl.
*H04L 12/26* (2006.01)
*H04J 1/00* (2006.01)

(52) U.S. Cl. ................. 370/242; 370/216; 370/230; 370/484

(58) Field of Classification Search .............. None
See application file for complete search history.

(56) References Cited

U.S. PATENT DOCUMENTS 6,002,693 A * 12/1999 Hahn ................. 370/466
6,687,751 B1 * 2/2004 Wils et al. ............ 709/230
6,765,866 B1 * 7/2004 Wyatt .................. 370/229
6,956,824 B2 * 10/2005 Mark et al. ............ 370/242
2004/0001478 A1 * 1/2004 Wong .................. 370/352
2004/0240385 A1 * 12/2004 Boggs et al. ............ 370/230
2006/0114876 A1 * 6/2006 Kalkunte ............... 370/341
2008/0037418 A1 * 2/2008 Cole et al. ............. 370/220

OTHER PUBLICATIONS

Mohan Kalkunte, "Network Device", U.S. Appl. No. 60/631,548, filed Nov. 30, 2004.

* cited by examiner

*Primary Examiner*—Ayaz R Sheikh
*Assistant Examiner*—Blanche Wong

(57) ABSTRACT

A routing apparatus comprising: 1) a first router coupled to a first plurality of Ethernet links; and 2) a second router coupled to a second plurality of Ethernet links, wherein selected ones of the first plurality of Ethernet links are coupled to selected ones of the second plurality of Ethernet links to thereby form Ethernet trunk groups in which traffic associated with a plurality of Ethernet ports are aggregated into a single logical port. The routing apparatus further comprises a first high-speed link and a second high-speed link directly coupling the first router and the second router and forming a self-healing ring for transferring data packets between the first and second routers. In response to a failure associated with the failing one of the first and second routers, the first and second high-speed links transfer data traffic from the failing router to the non-failing router.

20 Claims, 3 Drawing Sheets

APPARATUS AND METHOD FOR ARCHITECTURALLY REDUNDANT ETHERNET

TECHNICAL FIELD OF THE INVENTION

The present invention relates to data communication networks and, more particularly, to Ethernet networks.

BACKGROUND OF THE INVENTION

In Ethernet systems, each Ethernet interface has its own medium access control (MAC) address, which is used as the source address for frames sent from the interface and is the destination address to which frames for the interface are sent. Typically, Ethernet LANs are inter-connected via hubs or switches. Hubs and switches do not translate MAC addresses, so all frames with the destination address of the interface must go through the designated MAC device, thus creating a single point of failure.

The IEEE 802.3-2002 Standard defines Link Aggregation Groups to provide a larger aggregated bandwidth, load sharing, and link redundancy. These groups can be used to provide link redundancy, but still use a single MAC device with a single aggregator MAC address. Thus, there is still a single point of failure at the MAC device, so complete Ethernet redundancy is not provided.

Ethernet LANs are interconnected using bridges. One approach to Ethernet redundancy is to use a modified bridge that is capable of translating MAC addresses upon detection of an interface failure. There are some problems with this approach. First, Ethernet bridge protocols do not support this kind of failure processing. Second, an Ethernet bridge does not have enough fidelity in its failure detection to know precisely what failed and how to fix the failure. An Ethernet bridge only knows that the MAC address is no longer reachable through the port. Ethernet bridges may be reconfigured through spanning tree protocols to find a new path, but Ethernet bridges do not support reconfiguring interfaces for MAC address translation.

Another approach to avoiding the aforementioned single point of failure is to swap addresses in the MAC chip, thus having a different MAC chip serve the interface. This can lead to some problems during switch-over. If the second port is enabled before the first port is disabled, hubs and switches tend to lock up with protocol violations due to having two ports with the same MAC address. Ethernet protocols do not support removing the first link from the tables when the link failure occurs. Instead, Ethernet protocols must wait for the path to time out. These time-outs can be lengthy, thus leading to a significant amount of data loss.

Also, there is a potential for looping to occur when there are duplicate MAC addresses. Looping is a problem in Ethernet bridges, since packets get replicated on all interfaces. If there is a loop, the replication may repeat until all bandwidth is consumed. Spanning Tree Protocol (STP) and its rapid reconfiguration descendant, Rapid Spanning Tree Protocol (RSTP), were developed to eliminate loops. These protocols use a subset of the physical interconnections to form a tree spanning the entire network without loops. The protocols eliminate duplicate paths, so a hot second path tends to be eliminated by spanning tree protocols.

When security software sees duplicate MAC addresses, the security software sees this as a penetration by an unauthorized user. Thus, the approach of changing MAC addresses can also lead to security alerts.

Therefore, there is a need in the art for improved Ethernet redundancy. In particular, there is a need for an effective way to overcome single point MAC device failures.

SUMMARY OF THE INVENTION

The present invention provides redundancy at the Ethernet architectural level to provide Ethernet link and interface redundancy while avoiding single point MAC device failures. Advantageously, the present invention achieves this redundancy using conventional "pizza box" routers in a redundant architecture.

To address the above-discussed deficiencies of the prior art, it is a primary object of the present invention to provide an improved redundant routing apparatus. According to an advantageous embodiment of the present invention, the routing apparatus comprises: 1) a first router capable of being coupled to a first plurality of Ethernet links; and 2) a second router capable of being coupled to a second plurality of Ethernet links, wherein selected ones of the first plurality of Ethernet links are coupled to selected ones of the second plurality of Ethernet links to thereby form Ethernet trunk groups in which traffic associated with a plurality of Ethernet ports are aggregated into a single logical port.

According to one embodiment of the present invention, a first selected one of the first plurality of Ethernet links is coupled to a first selected one of the second plurality of Ethernet links to thereby form a first trunk group.

According to another embodiment of the present invention, the first selected one of the first plurality of Ethernet links and the first selected one of the second plurality of Ethernet links are capable of carrying the first trunk group traffic simultaneously in a load-sharing manner.

According to still another embodiment of the present invention, a subset of the first plurality of Ethernet links and a subset of the second plurality of Ethernet links are each capable of carrying all of the first trunk group traffic.

According to yet another embodiment of the present invention, the routing apparatus further comprises a first high-speed link coupling the first router and the second router for transferring data packets between the first and second routers.

According to a further embodiment of the present invention, the routing apparatus further comprises a second high-speed link coupling the first router and the second router for transferring data traffic between the first and second routers.

According to a still further embodiment of the present invention, the first and second high-speed links form a self-healing ring with the first router and the second router.

According to a yet further embodiment of the present invention, the first and second high-speed links transfer data traffic from a failing one of the first router and the second router to a non-failing one of the first router and the second router in response to a failure associated with the failing one of the first and second routers.

In one embodiment of the present invention, the failure is associated with one of: 1) the first plurality of Ethernet links, 2) the second plurality of Ethernet links, 3) an interface coupled to a link in the first plurality of Ethernet links; and 4) an interface coupled to a link in the second plurality of Ethernet links.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
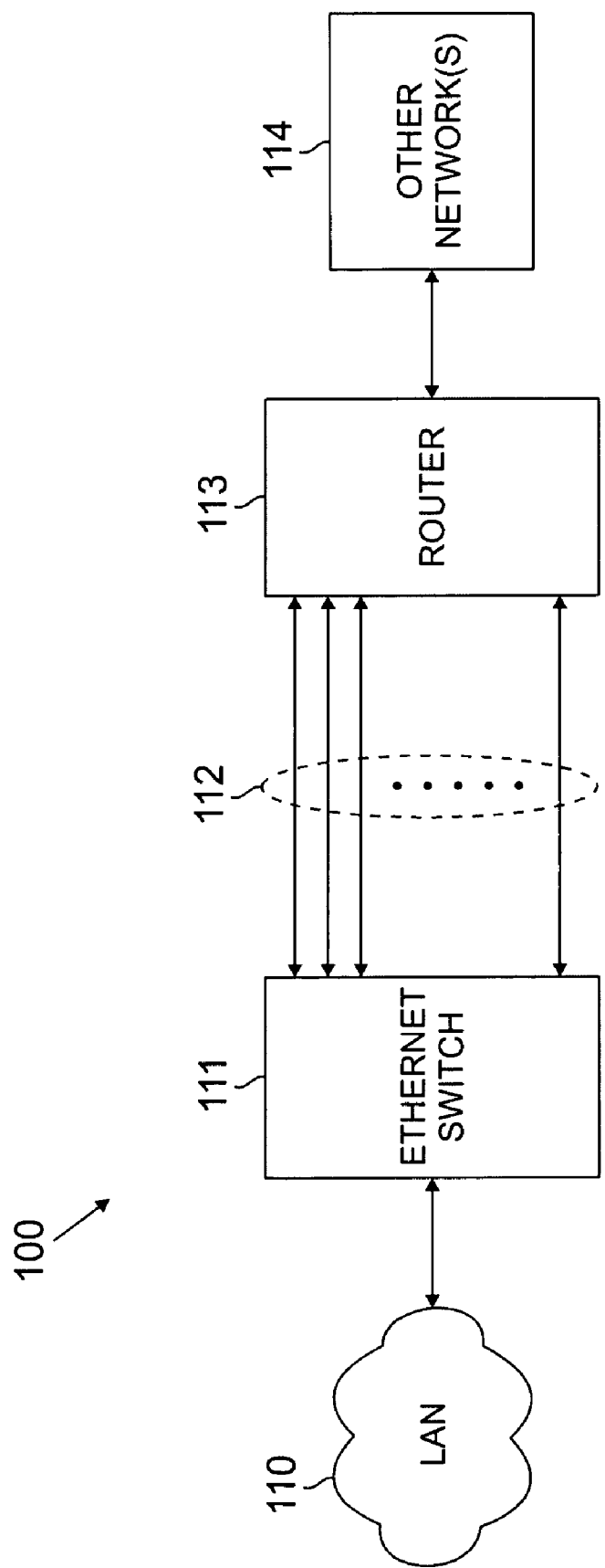
FIG. 1 illustrates an exemplary prior art Ethernet data network.
Figure 2:
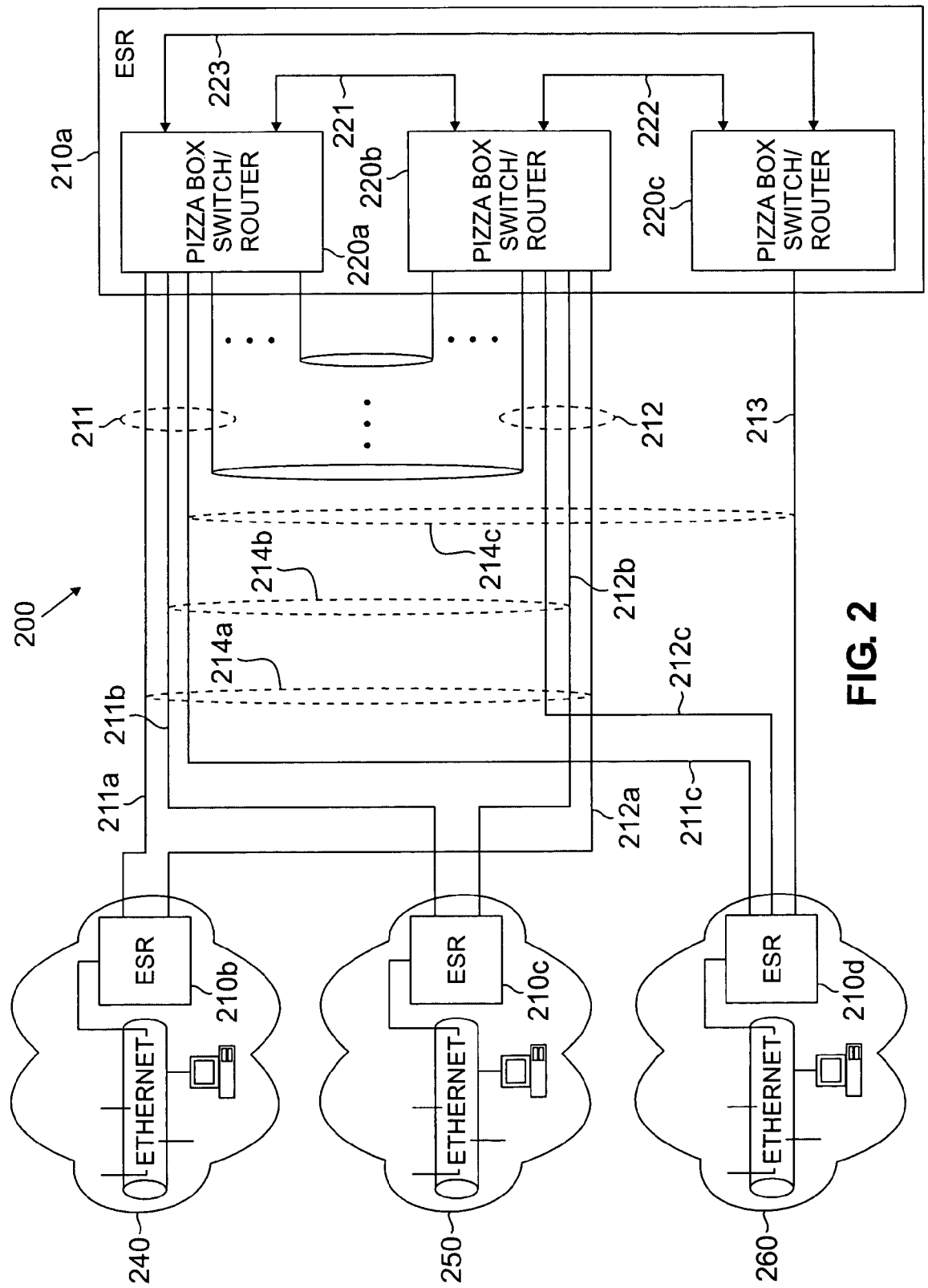
FIG. 2 illustrates an exemplary Ethernet data network that contains Ethernet switch routers according to the principles of the present invention.
Figure 3:
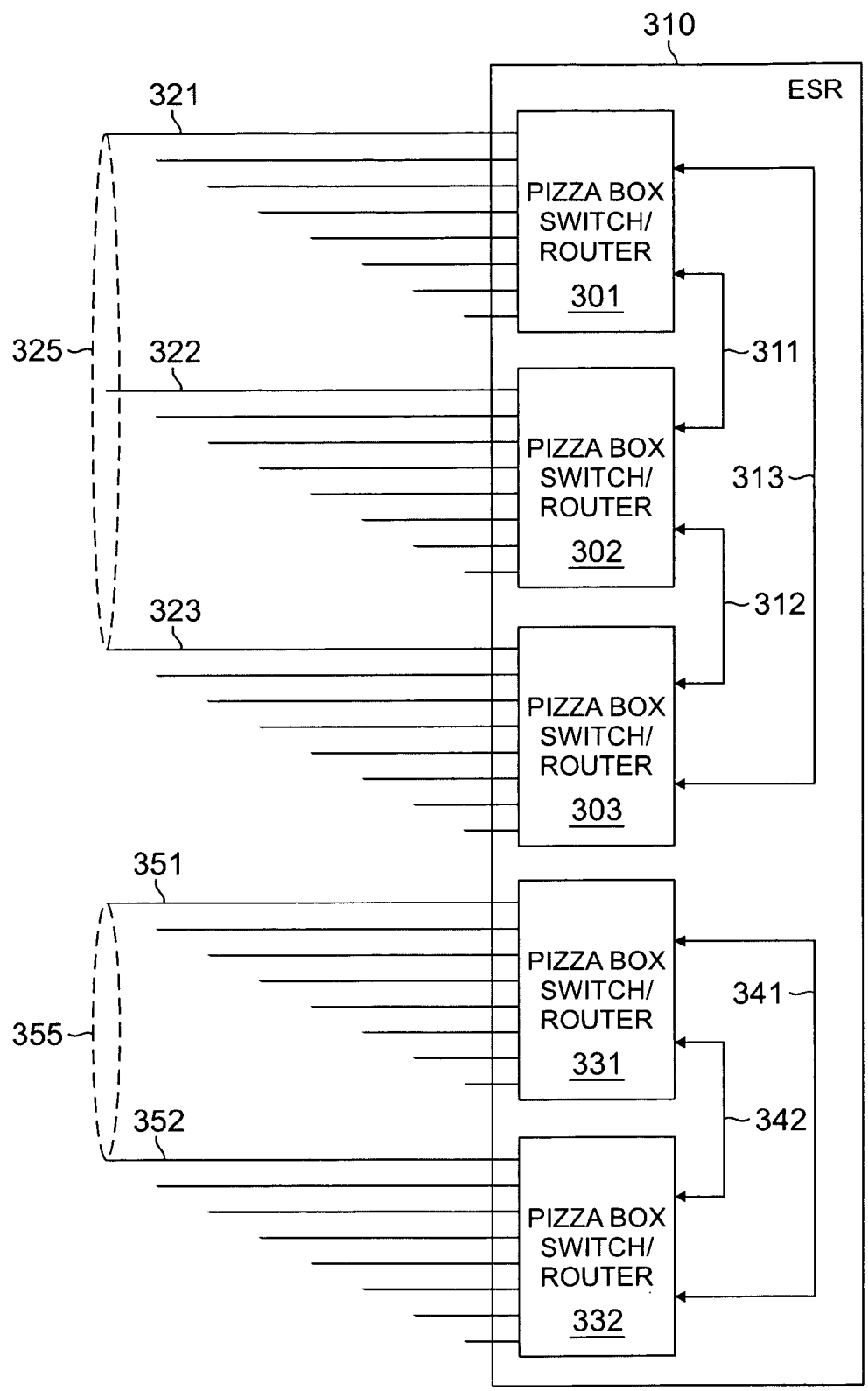
FIG. 3 illustrates an alternate embodiment of an Ethernet switch router according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data communication system.

FIG. 1 illustrates exemplary prior art Ethernet network 100. Prior art Ethernet network 100 comprises local area network (LAN) 110, Ethernet switch 111, links 112, router 113 and other network(s) 114. Router 113 is coupled to Ethernet switch 111, which is in turn coupled to LAN 110. Router 113 is also connected to another data communication network (or networks) 114. Each link in links 112 between Ethernet switch 111 and router 113 is connected in an Ethernet trunk group, wherein multiple ports are aggregated into a single logical port. Such trunk groups are described in the IEEE 802.3-2002 standard, which refers to such trunk groups as "Link Aggregation Groups".

Each interface of Ethernet switch 111 that is associated with one of links 112 has a MAC address, but the Ethernet switch uses a single, logical MAC address for all interfaces associated with the link aggregation group. This is the MAC address assigned to the aggregator, which may be one of the MAC addresses of a component interface or may be a separate MAC address assigned to the aggregator. In this type of arrangement, a failure in any one of links 112 would result in the rest of links 112 carrying the traffic with the available remaining bandwidth. However, the traffic on all of links 112 flows through a single MAC device doing the link aggregation. Failure of this MAC device would be an example of a single point failure at the MAC device, as discussed generally above.

FIG. 2 illustrates exemplary Ethernet data network 200, which contains Ethernet switch routers 210 according to the principles of the present invention. Architectural redundancy is provided in order to overcome single point failures at the MAC device. Network 200 comprises Ethernet switch router 210a, links 211, links 212, link 213, local area network (LAN) 240, local area network (LAN) 250, and local area network (LAN) 260. In the exemplary embodiment, each link in links 211 and links 212, and link 213 carry data at a rate of 1 GBps (gigabit per second).

Exemplary Ethernet switch/router (ESR) 210a comprises switch/router 220a, switch/router 220b, and switch/router 220c. Each one of switch/routers 220a-c is a "pizza box" type router, so called because the size and shape of router is approximately that of a pizza box. Switch/routers 220a, 220b and 220c are connected in self-healing rings by link 221, link 222, and link 223. In the exemplary embodiment, links 221, 222 and 223 are HiGig interfaces that carry data at a rate of 12 GBps.

Switch/router 220a is coupled to links 211 and switch/router 220b is coupled to links 212. Sets of links in links 211 and links 212 form trunk groups (or link aggregation groups according to in the IEEE 802.3-2002 standard). For example, link 211a, which is coupled to switch/router 220a, and link 212b, which is coupled to switch/router 220b, form trunk group 214a, indicates by a dotted line loop. Similarly, link 211b and link 212b form trunk group 214b. Finally, link 211c, link 212c, and link 213, which is coupled to switch/router 220c, form trunk group 214c.

Links 211a and 212a of trunk group 214a are coupled to Ethernet switch/router (ESR) 210b in LAN 240. Links 211b and 212b of trunk group 214b are coupled to Ethernet switch/router (ESR) 210c in LAN 250. Finally, links 211c, 212c and 213 of trunk group 214c are coupled to Ethernet switch/router (ESR) 210d in LAN 260.

Switch router 220a and switch router 220b carry traffic in a load-sharing manner on links 211a and 212a in trunk group 214a until something fails (e.g., a link to a pizza box router, one of the pizza box router interfaces, or a pizza box router itself) on one of the two paths. If this occurs, then all of the traffic flows over the remaining good path.

In the exemplary embodiment shown in FIG. 2, it is assumed that ESR 210b in LAN 240, ESR 210c in LAN 250, and ESR 210d in LAN 260 are similar to ESR 210 and support this type of redundancy. However, if ESR 210b, ESR 210c and ESR 210d are not the same as ESR 210a, then it is assumed that ESR 210b, ESR 210c and ESR 210d support IEEE 802.3 link aggregation at the expense of a single point of failure at the MAC device at ESR 210b, ESR 210c and ESR 210d while still avoiding single point failures on the WAN links and in ESR 210a. It is assumed that the WAN interfaces of LAN 240, LAN 250 and LAN 260 are protected by redundancy, since each affects many users, whereas the connections within each LAN may not affect as many simultaneous users.

Two or more links in an Ethernet trunk group may be used simultaneously in a load sharing manner to handle the traffic for the associated Ethernet trunk group. For example, if one interface or link of a redundant trunk group pair fails, then all traffic for that client (i.e., that trunk group) will be carried by the remaining redundant interface or link. Links 221-223 may be used to get traffic from working interfaces and links of switch/routers 220a, 220b, or 220c with the failed interface to the other switch/router in which the paired interface is working.

For example, if link 211a fails, but link 212a continues to work, then packets coming into switch/router 220a on link 211b that are destined for failed link 211a may be transferred from switch/router 220a across link 221 to switch/router 220b and sent out link 212a. If switch/router 220a fails, then the remote end could sense the failure and direct all traffic to the remaining good switch/router 220b. The remote end senses the lost connection with far end of a link and sends all data over the remaining good link.

If entire switch/router 220a fails, there may not be enough function components left to send data over links 221-223 to the other switch/router. However, if only portions of a switch router fail, then links 221-223 may be used to route data between the router 220a with the failed interface or link and the router with the good interface and link, such as router 220b or 220c. If one of links 221, 222 or 223 fails, then the other interface is available to carry traffic between the switch/routers as may be necessary. For example, if link 221 or its interface in switch/router 220a fails, switch/router 220a may still send data to switch/router 220b in two steps via links 223 and link 222.

Considering now the particular example of the redundant pair of links 211a and 212a. If link 211a fails, then traffic for that client can be carried via links 212a and switch/router 220b. Similarly, if link 212a fails, then traffic for that client can be carried via interface 211a and switch/router 220a.

Considering further exemplary failure scenarios, if switch/router 220a fails, then all traffic received by switch/router 220a may be forwarded to switch/router 220b via one of the redundant links 221 or 223 and 222. Switch/router 220b then forwards the traffic on to other network(s). This is true if there is a partial failure, so that some of the interfaces of failed switch/router 220a or 220b still work. In case of a total failure of switch/router 220a or 220b, the remote end can recognize the failure and send all traffic to the good switch/router. If link 221 fails and some interfaces of switch/router 220b fail, then redundant links 223 and 222 are still available to forward traffic for failed link 221 between switch/router 220b and switch/router 220a.

FIG. 3 illustrates Ethernet switch/router (ESR) 310 according an alternate embodiment of the present invention. ESR 310 comprises switch/router 301-303, links 311-313, links 321-323, switch/routers 331 and 332, links 341 and 342, and links 351 and 352. In the arrangement of FIG. 3, switch/routers 301, 302 and 303 provide three-way redundancy for Ethernet trunk groups or link aggregation groups formed from links coupled to switch/routers 301-303, such as links 321-323. By way of example, links 321-323 form trunk group 325, indicated by a dotted line loop. Similarly, switch/routers 331 and 332 provide two-way redundancy for Ethernet trunk groups or link aggregation groups formed from links coupled to switch/routers 331 and 332, such as links 351 and 352. By way of example, links 351 and 352 form trunk group 355, indicated by a dotted line loop.

Links 321-323 may handle the traffic simultaneously in load-sharing fashion, but any one or two of them can handle all of the traffic, if necessary. Link 311 interconnects switch/routers 301 and 302, link 312 interconnects switch/routers 302 and 303, and link 313 interconnects switch/routers 301 and 303. In the three-way redundancy arrangement provided by switch/routers 301, 302 and 303, switch/router 301 is linked to switch/router 303 both by link 313, and by links 311 and 312 in combination with switch/router 302. Links 351 and 352 may handle the traffic simultaneously in load-sharing fashion, but either one can handle all of the traffic, if necessary. Links 341 and 342 interconnect switch/routers 331 and 332.

In some embodiments, each of the switch/routers 301-303, 331 and 332 can receive traffic from any of the ports of a given trunk group. The switch/routers can also send traffic to any port of a given trunk group using, for example, a suitable conventional software selection algorithm. The switch/routers can maintain packet sequencing using any suitable packet sequencing method, for example, the method described in co-pending U.S. patent application Ser. No. 10/655,149, entitled "APPARATUS AND METHOD FOR MAINTAINING PACKET SEQUENCING IN A PARALLEL ROUTER", which is incorporated herein by reference.

Also, the methods employed by IEEE 802.3-2002 for maintaining packet sequencing over Link Aggregation Groups can be employed. This is the preferred method if one end of the Link Aggregation Group is a standard 802.3-2002 Ethernet Switch supporting Link Aggregation Groups. This end of the link aggregation loop will be subject to single point failures at the MAC device, while the ESR end will be immune from the single point failures at the MAC device.

Although the present invention has been described with an exemplary embodiment, various changes and modifications may be suggested to one skilled in the art. It is intended that the present invention encompass such changes and modifications as fall within the scope of the appended claims.

What is claimed is:

1. A routing apparatus comprising:
   a first router coupled to first and second pluralities of Ethernet links; and
   a second router coupled to third and fourth pluralities of Ethernet links,
   wherein selected ones of the first plurality of Ethernet links and selected ones of the third plurality of Ethernet links form a first IEEE 802.3 link aggregation group, and selected ones of the second plurality of Ethernet links and selected ones of the fourth plurality of Ethernet links form a second IEEE 802.3 link aggregation group.

2. The routing apparatus as set forth in claim 1, wherein first selected ones of the first plurality of Ethernet links and first selected ones of the third plurality of Ethernet links form a first trunk group.

3. The routing apparatus as set forth in claim 2, wherein the first selected ones of the first plurality of Ethernet links and the first selected ones of the third plurality of Ethernet links are configured to carry the first trunk group traffic simultaneously in a load-sharing manner.

4. The routing apparatus as set forth in claim 3, wherein the first selected ones of the first plurality of Ethernet links are configured to carry all of the first trunk group traffic and the first selected ones of the third plurality of Ethernet links are configured to carry all of the first trunk group traffic.

5. The routing apparatus as set forth in claim 4, further comprising a first high-speed link having a data rate of at least 1 Gbps coupling said first router and said second router for transferring data traffic between said first and second routers.

6. The routing apparatus as set forth in claim 5, further comprising a second high-speed link having a data rate of at least 1 Gbps coupling said first router and said second router for transferring data traffic between said first and second routers.

7. The routing apparatus as set forth in claim 6, wherein said first and second high-speed links form a self healing ring with said first router and said second router.

8. The routing apparatus as set forth in claim 7, wherein said routing apparatus is configured to transfer data traffic from said first router to said second router in response to a failure of at least one component associated with said first router.

9. The routing apparatus as set forth in claim 8, wherein the at least one failed component comprises one of: 1) the first plurality of Ethernet links, and 2) an interface coupled to a link in the first plurality of Ethernet links.

10. A data communication system, comprising:
a data communication network; and
a plurality of local area networks coupled to said data communication network, wherein each one of said plurality of local area networks includes a routing apparatus comprising:
a first router coupled to first and second pluralities of Ethernet links; and
a second router coupled to third and fourth pluralities of Ethernet links,
wherein selected ones of the first plurality of Ethernet links and selected ones of the third plurality of Ethernet links form a first IEEE 802.3 link aggregation group, and selected ones of the second plurality of Ethernet links and selected ones of the fourth plurality of Ethernet links form a second IEEE 802.3 link aggregation group.

11. The data communication system as set forth in claim 10, wherein first selected ones of the first plurality of Ethernet links and first selected ones of the third plurality of Ethernet links form a first trunk group.

12. The data communication system as set forth in claim 11, wherein the first selected ones of the first plurality of Ethernet links and the first selected ones of the third plurality of Ethernet links are configured to carry the first trunk group traffic simultaneously in a load-sharing manner.

13. The data communication system as set forth in claim 12, wherein the first selected ones of the first plurality of Ethernet links are configured to carry all of the first trunk group traffic and the first selected ones of the third plurality of Ethernet links are configured to carry all of the first trunk group traffic.

14. The data communication system as set forth in claim 13, further comprising a first high-speed link having a data rate of at least 1 Gbps coupling said first router and said second router for transferring data traffic between said first and second routers.

15. The data communication system as set forth in claim 14, further comprising a second high-speed link having a data rate of at least 1 Gbps coupling said first router and said second router for transferring data traffic between said first and second routers.

16. The data communication system as set forth in claim 15, wherein said first and second high-speed links form a self-healing ring with said first router and said second router.

17. The data communication system as set forth in claim 16, wherein said data communication system is configured to transfer data traffic from said first router to said second router in response to a failure of at least one component associated with said first router.

18. The data communication system as set forth in claim 17, wherein the at least one failed component comprises one of: 1) the first plurality of Ethernet links, and 2) an interface coupled to a link in the first plurality of Ethernet links.

19. A data communication method comprising the steps of:
sharing traffic in a first IEEE 802.3 link aggregation group among first and second Ethernet interfaces;
sharing traffic in a second IEEE 802.3 link aggregation group among third and fourth Ethernet interfaces;
providing to a first router the traffic carried by the first and third Ethernet interfaces; and
providing to a second router the traffic carried by the second and fourth Ethernet interfaces.

20. The data communication method as set forth in claim 19, further comprising the step of carrying all of the traffic in the first IEEE 802.3 link aggregation group on the first Ethernet interface in response to a failure of the second Ethernet interface.

* * * * *